March 8, 1960   G. N. ABBOTT   2,927,685
EYE GLASS CASE
Filed Nov. 13, 1957

INVENTOR.
GALEN N. ABBOTT
BY Kenneth M. Thorpe
ATTY.

United States Patent Office 2,927,685
Patented Mar. 8, 1960

2,927,685
EYE GLASS CASE
Galen N. Abbott, Eldorado, Kans.

Application November 13, 1957, Serial No. 696,181

1 Claim. (Cl. 206—6)

This invention relates to an improvement in eye glass or spectacle cases or containers and has for its general object to produce a portable or pocket case in which the eye glasses or spectacles are always maintained, when in the case, with the lens out of contact with any part of the container or case. It has been observed that, over a period of time, the inner lining of eye glass or spectacle cases or containers accumulate abrasive dust particles collected in the case when it is open and deposited on the case lining by wiping contact with dusty or dirty lenses. As lenses become more expensive due to the wide use of bifocals, trifocals and the like, the abrasion of the lenses becomes more and more of an economic problem due to costly replacements.

Another object of the invention is to produce a case or container in which, in its preferred form, the mere closing of the lid or cover of the container automatically insures that the spectacle or eye glasses are clamped in the case so that there is no danger of the lens contacting the wall of the case.

With the general objects named in view and others as will hereinafter appear, the invention consists in certain new and useful features of construction and organization of parts as hereinafter described and claimed; and in order that it may be fully understood, reference is to be had to the accompanying drawing, in which:

Figure 1:
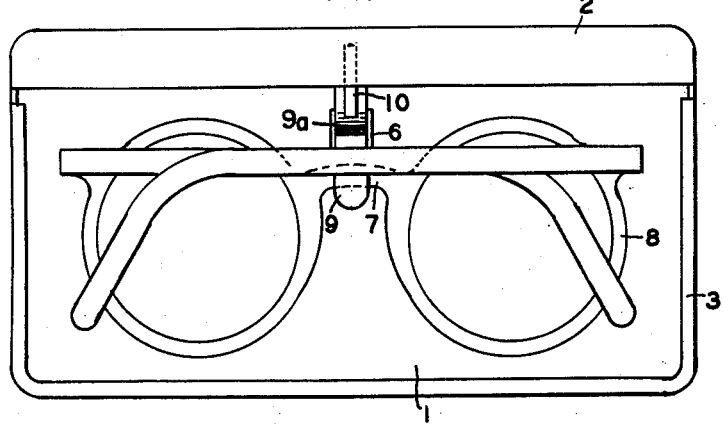
Figure 1 is an eye glass container embodying the invention with the cover or lid removed.
Figure 2:
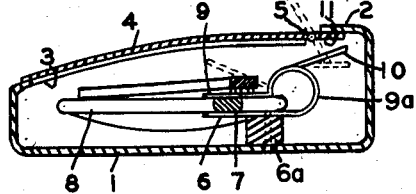
Figure 2 is a cross section through the structure as shown in Figure 1, with the cover closed.

In general, the construction embodies a container 1 of rigid construction and having an overlying flange 2 along its rear edge and narrow overlying flanges 3 on its other three sides. A rigid cover 4 having pins 5 pivoted in the end walls of the container 1, overlies the flanges 3 and underlies the flange 2, as shown in Figure 2, when said cover is in closed position. A ledge or platen 6a may be built up from the bottom of the container 1, said platen being of sufficient area to underlie and support the bridge 7 of spectacles 8.

Secured to the container or to the platen itself, is a spring, which in the form illustrated, is one movable leg 9 of a U-shaped spring clip, the other leg 6 of said clip being securely attached to the platen 6a and thus forming a part thereof. The two legs may be united by a generally circular yielding loop 9a which will permit hinge action of the legs when force is properly applied as will hereinafter appear.

In the present embodiment of the invention, however, the construction is illustrated in its simplest form. As shown, the spring loop 9a has an extension lug 10. Downward pressure on the lug 10 will force yielding of the loop 9a to place leg 9 in open or diverting relation to the platen.

To close the container, the cover 4 may be hinged at 5, said cover having an extension 11 which strikes the lug 10 when the cover is swung to open position, and depresses said lug to open or swing the leg 9 away from the platen 6a. With the cover open it will be apparent that the bridge 7 of the spectacle 8 may be readily removed or inserted between the platen 6a and the clamp 9a. When the cover is closed, the pressure exerted by the clamp 9a will cause the bridge 7 to rock on the platen 6a and swing the spectacle frame into cantilevered relation above the bottom of the container as shown in Figure 2.

From the above description and drawing, it will be apparent that I have produced a construction embodying all of the features of advantage set forth as desirable; and while I have described and illustrated the preferred form, it is to be understood that I reserve the right to all changes within the spirit and scope of the appended claim.

I claim:

A spectacle container of generally rectangular form having a bottom, four sides and an open top, a platen formed on said bottom with its operating face intermediate the planes of the top and bottom of the container, a resilient clamp jaw in the container normally applying pressure in opposition to the platen and adapted to clamp against the bridge of a spectacle frame to cantilever the frame from the platen above the container bottom, a top cover pivoted to the container and formed with an extension moving into the container when the cover is opened, and a lug projecting from the resilient clamp jaw and contacted by the cover extension when the cover is opened to effect opening movement of the clamp jaw.

References Cited in the file of this patent

UNITED STATES PATENTS

| 608,640 | Bemis | Aug. 9, 1898 |
| 1,248,893 | Nivois | Dec. 4, 1917 |
| 2,692,043 | Davis | Oct. 19, 1954 |